May 18, 1954

E. M. WILSON 2,678,594

AXLE LOCKING DEVICE FOR OSCILLATABLE
WHEEL AND AXLE ASSEMBLY

Filed April 25, 1952

INVENTOR

Eldon M. Wilson

Pierce, Scheffler & Parker
ATTORNEYS

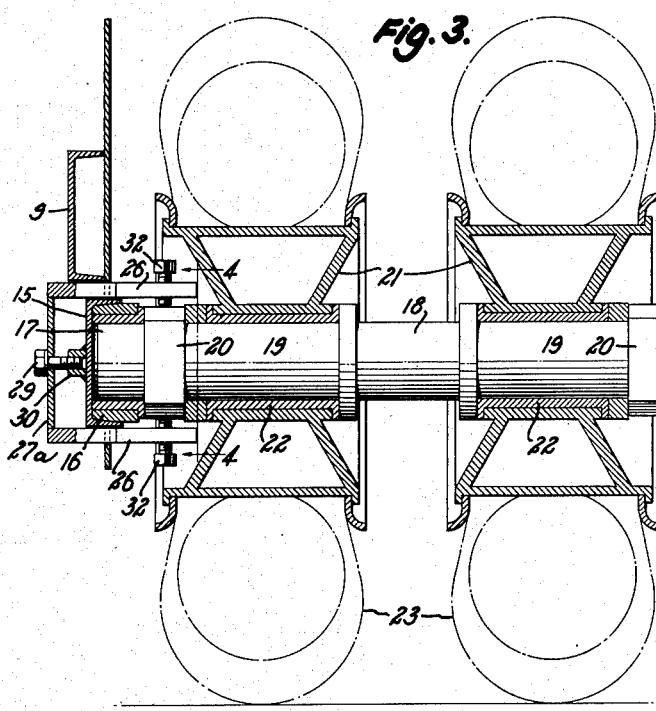
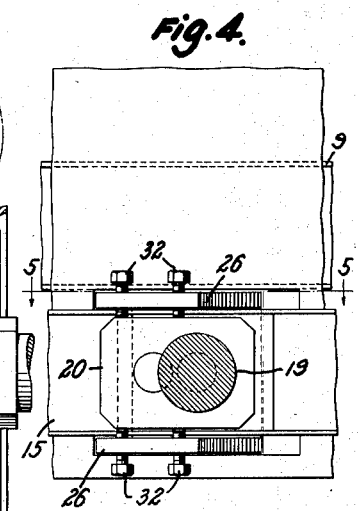
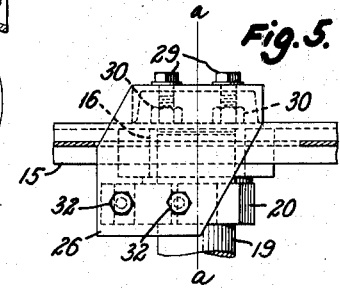
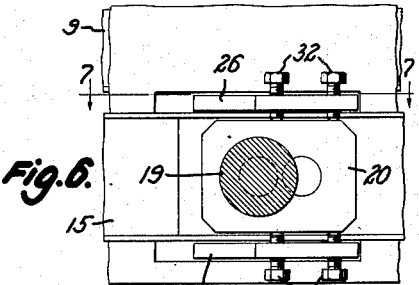
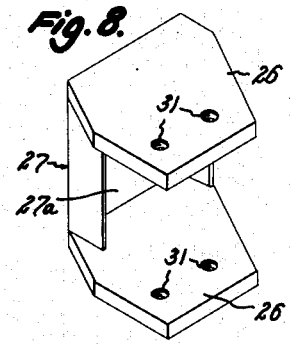
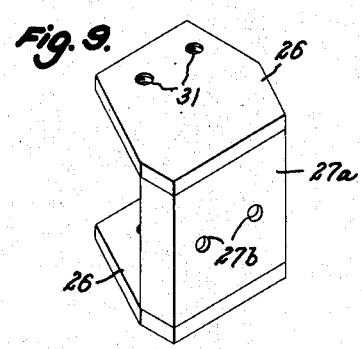

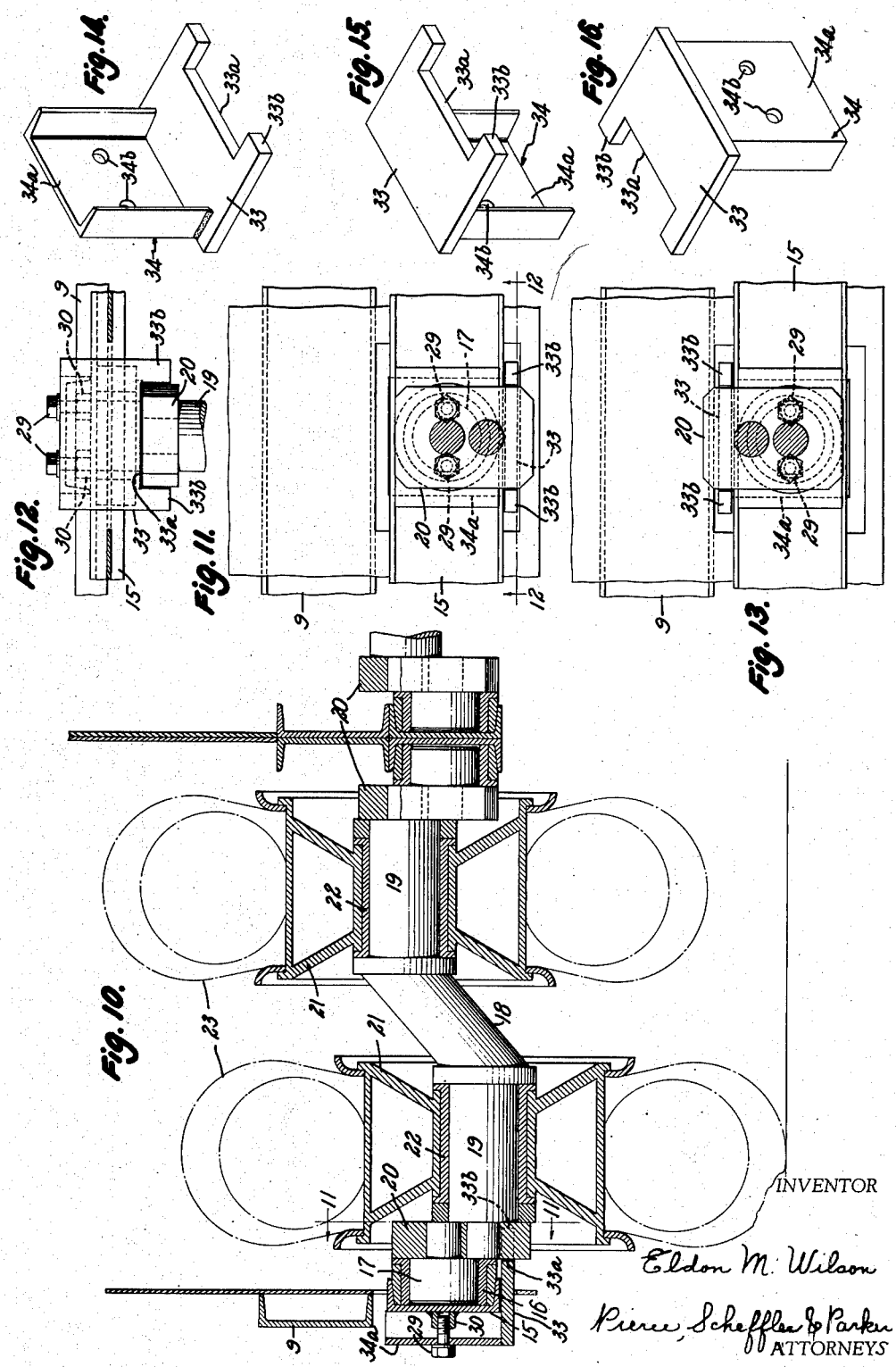

UNITED STATES PATENT OFFICE 2,678,594

AXLE LOCKING DEVICE FOR OSCILLATABLE WHEEL AND AXLE ASSEMBLY

Eldon M. Wilson, La Canada, Calif., assignor to Super-Compactors, Inc., Sacramento, Calif., a corporation of California Application April 25, 1952, Serial No. 284,212

6 Claims. (Cl. 94—50)

The present invention relates to an oscillatory wheel and axle assembly and more particularly to an assembly comprising an axle journalled in end bearings located coaxial with the axle axis, the axle being provided with pairs of high pressure rubber tired wheel mounting bearings, the bearings of each pair being located on opposite sides of the axle axis and equally eccentric thereto whereby the wheels are free to oscillate about the axle axis and thereby share equally in supporting the load carried by the axle.

Axle mountings of this general type are particularly useful in roller type earth compaction apparatus and which provides high intensity mass loading for superior compaction of fills, subgrades in cut sections, sealing of cracks in asphalt paved surfaces, etc.

These compactors having gross weights up to 200 tons carried by two axially aligned axle sections each mounting a pair of rubber tired wheels may thus impose a load of up to 50 tons on each wheel and tire. When the compactor is rolled across an irregular surface the wheels may become burdened with loads even greater than 50 tons but overloading of individual tires is reduced by the oscillating coupling which ties the wheels of each pair together while allowing sufficient flexibility for each pair to adjust itself to surface irregularities. Obviously without this flexibility, the added shock and stress imposed upon the tires when the apparatus is drawn across an uneven surface would result in excessive wear, depreciation and failure of the expensive, specially-made tires which are necessary. Moreover the high intensity compaction pattern normally achieved deep in the sub soil by virtue of the close wheel spacing is dependent upon wheel pair flexibility.

While the wheels of each pair are normally flexible so as to better distribute the load on uneven ground, it has been found desirable that means be provided whereby the axle may be locked in alternative positions with respect to the frame. In one such position only one wheel of each pair carries the load, and in the other position, both wheels of each pair are secured at the same level. The first of these two alternative, fixed positions is used when a tire requires repair, or when the compactor is hauled without ballast loading from one job to another, or for purposes of test when rolling existing pavement or new grade or sub-grade under load to determine wheel load capacity of an existing pavement or a base before laying the final pavement surface. This is most important as regards construction of landing strips for airports where the wheel loading for commercial and military aircraft now in use runs very high. The other axle position, namely with both wheels locked at the same level is advantageous for the final compaction phase after substantially all surface irregularities have been rolled out.

It is therefore the principal object of this invention to provide an improved arrangement whereby the normally oscillatable axle may be secured against oscillation in alternative positions so as to either concentrate the load on less than the normal number of wheels which otherwise divide the load substantially equally between them, or produce the same effect as would be the case were all wheels to be carried on bearings coaxial with the axle axis.

A more specific object is to provide an axle lock comprising a yoke adapted to be secured in place on the frame and which embraces a crank arm portion of the axle thus locking the axle against oscillation about its axle. The axle may be locked by the yoke in such angular position that one of the two eccentrically mounted wheels carried by the axle is secured at a higher level than the other so as to concentrate the entire axle load on one wheel, or the yoke may be so fixed on the eccentric that both wheels are locked at the same level. The yoke may also be reversed so that the outer wheel leads the inner wheel or vice versa when both wheels are locked at the same level.

In the accompanying drawings illustrating a preferred embodiment of the invention:

Fig. 3 is a vertical central longitudinal section through one of the two eccentric axles locked in the position shown in Fig. 1;

Fig. 4 is a transverse section on line 4—4 of Fig. 3;

Fig. 5 is a sectional detail on line 5—5 of Fig. 4 showing the locking yoke in one of its two alternative positions;

Figs. 6 and 7 are views similar to Figs. 4, 5 showing the locking yoke in its other position;

Figs. 8 and 9 are views in perspective of the yoke used to lock the wheels at the same height;

Fig. 10 is a vertical central longitudinal section through one of the two eccentric axles when locked by the other yoke in a position such that one wheel (the outer one) is higher than the other so as to concentrate the entire axle load on that one wheel.

Fig. 11 is a transverse section on line 11—11 of Fig. 10;

Fig. 12 is a sectional view on line 12—12 of Fig. 11;

Fig. 13 is a view similar to Fig. 11 showing the axle locked by the yoke in such position that the inner wheel is lower than the outer one and carries the entire axle load; and Figs. 14, 15 and 16 are views in perspective of the yoke used to lock the eccentric axle with one wheel higher than the other.

Figure 1:
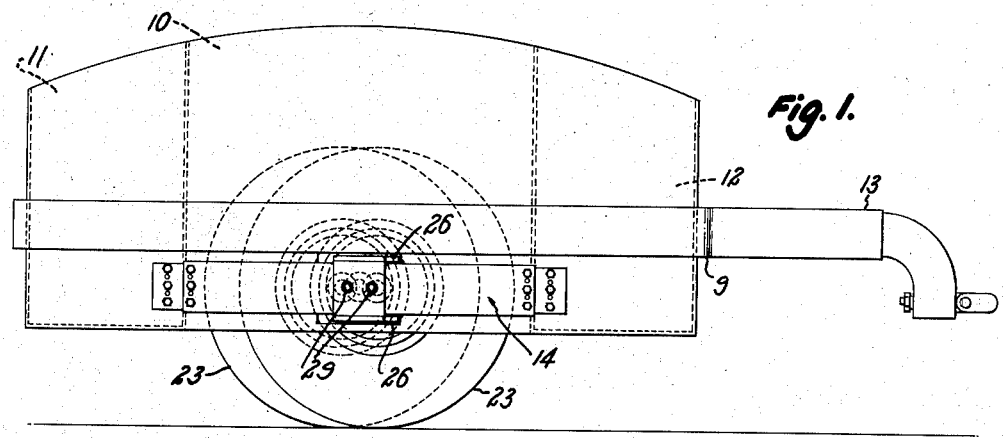
Fig. 1 is a view in side elevation of the compactor with the eccentrically mounted wheels locked at the same height.

With reference now to the drawings, it will be seen that the roller compactor is comprised of an upper main frame 9 carrying the body of the compactor which includes a wheel housing compartment 10 intermediate two ballast compartments 11 and 12, and a drawbar assembly 13 fastened to the frame 9 whereby the latter is adapted to be towed by a prime mover (not shown).

The design of the structural frame comprises no part of the present invention and may be modified in any manner dictated by convenience and necessity. However, the invention finds its maximum utility in a rigid unitary structure suitable for ballast carrying and which is designed for the close spacing of a plurality of wheels which are in general, approximately but not exactly co-axially aligned.

Below the underside of the main frame 9 is a box frame 14 secured in place by bolting the same to the outer side walls of the compartments 11 and 12, the frame 14 being comprised of channel beams 15 which in their web portions mount four axially aligned bearings 16 for receiving the trunnions 17 of the two axles 18. Each axle 18 includes two wheel mounting portions 19 intermediate the end trunnions and which are arranged equally eccentric to and on opposite sides of the axle axis, i. e. the axis through trunnions 17, the outer ends of the offset wheel mounting portions being united with the adjacent end trunnions 17 by means of crank arms 20 which extend transverse to the axle axis.

The two wheels 21 on each axle are mounted by means of bearing assemblies 22 for rotation about the wheel mounting portions 19, rotation of the wheels therefore being independent of the oscillatory motion of the axle trunnions 17 in their bearings 16. Each wheel is equipped with specially built, high pressure pneumatic tire 23 adapted to carry pressures up to and even exceeding 150 pounds per square inch and have as many as 32 plies. Accordingly each axle 18 and its pair of pneumatically tired wheels comprise a unitary oscillatory assembly which is capable, within the limits of total eccentricity of the wheel mounting portions 19, of automatically compensating for irregularities of the surface on which the wheels roll and therefore capable of automatically distributing evenly between the wheels whatever load is applied to the oscillatable assembly.

The construction so far described is not considered to be novel with the present applicants but rather has been included as background for the subject matter of the present invention which is predicated upon the structure now to be described by which the axles may lock against oscillation in such alternative manners as to concentrate the load of each axle on one of the two wheels which it carries or alternatively to set both wheels at the same elevation. As indicated in the introduction, such axle locking means will prove advantageous in a number of situations such as where the compactor is to be moved with a flat tire, or is to cover long distances on highways either empty or with light load. Further, when a compactor is to be employed as a test loading apparatus, the load may be placed on the two outside wheels, to duplicate the effect produced by heavy pneumatic tired wheel loads. The axles may also be locked in the position where all four wheels are fixed at the same elevation with either the inner wheel of each pair trailing the outer wheel or vice versa, this being a condition useful for rolling asphaltic pavements to seal cracks and smooth them thereby increasing their life. This type of operation is also useful for final rolling of surfaces to be paved.

Figure 2:
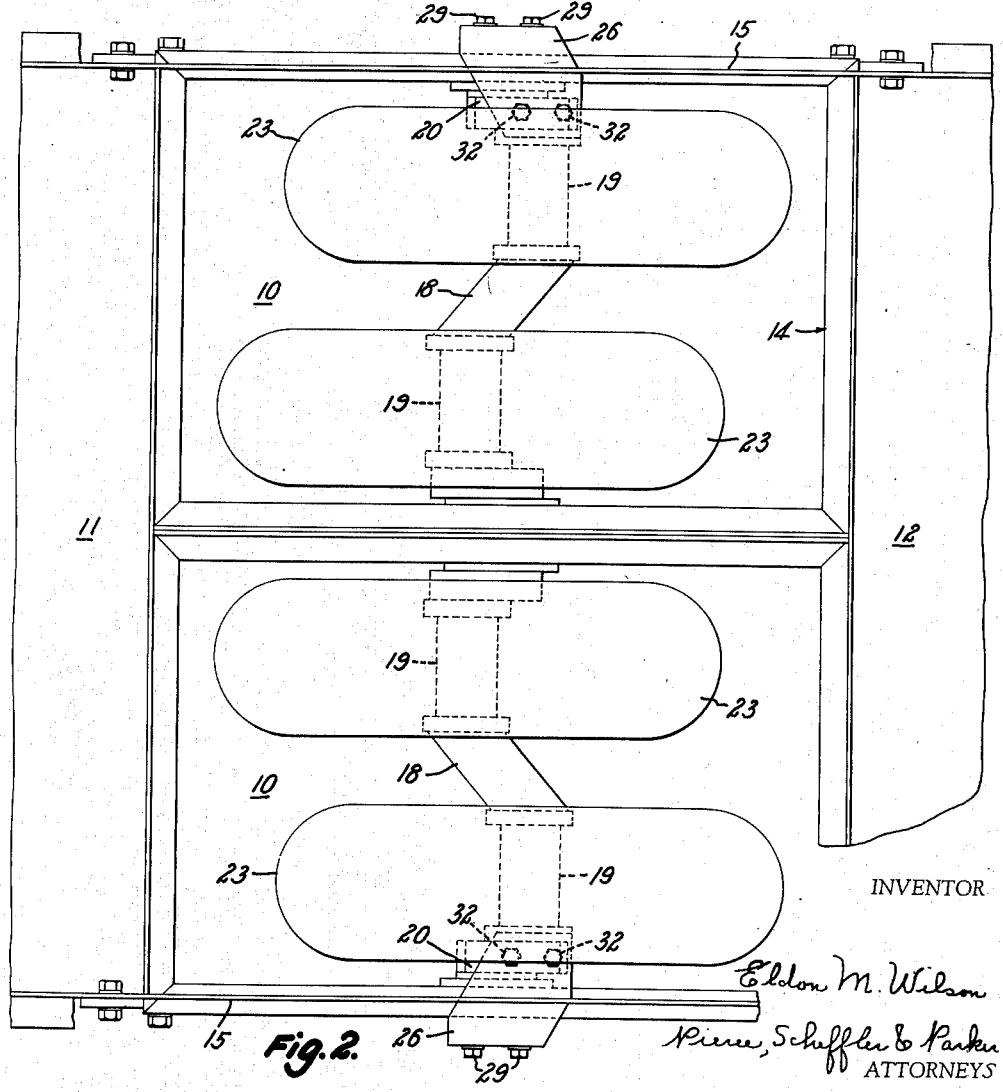
Fig. 2 is a fragmentary top plan view of the compactor shown in Fig. 1.

The improved device for locking the axle in a position such that both wheels are at the same height is illustrated most clearly in Figs. 2-9 from which it will be seen that the locking yoke is comprised of a pair of plates 26 secured in parallel spaced relation by welding to the end faces of a short section of channel beam 27. The web portion 27a of the channel beam 27 is provided with two spaced apertures 27b for receiving stud bolts 29 that thread into nuts 30 welded to the outer face of the web portion of the trunnion frame beam 15. Nuts 30 lie on opposite sides of and are equidistant from the longitudinal axis a—a of the axle, that is the center line of bearing 16, for a reason to be later explained. The spacing between plates 26 is made just slightly greater than the height of channel beam 15 so as to clear the flanges of the latter when bolted on, and the outer, free end portions of plates 26 are provided with a pair of spaced and threaded apertures 31 which overlie opposite faces of the crank arm portion 20. The plates 26, i. e. the yoke, thus embrace the crank arm 20. Screws 32 threaded into the apertures 31 until the ends engage the face of the crank arm 20 serve to lock the axle in the angular position shown in Fig. 2 wherein crank arm portion 20 occupies a horizontal position forward of the axle axis and both wheel mounting portions 19 are at the same level with the outer one, i. e., the one nearest the side of the compactor in advance of the inner one.

Because the attaching nuts 30 lie equidistant from the centerline of the bearing 16 the locking yoke 26 may be reversed as shown in Figs. 6, 7 so as to bring the locking screws 32 against the crank arm portion 20 when the axle is in such angular position that crank arm portion 20 occupies a horizontal position rearward of the axle axis and both wheel mounting portions 19 are at the same level but with the inner one in advance of the outer one.

To lock the axle in such position that one wheel mounting portion 19 is higher than the other by a distance sufficient to concentrate the axle load on only one of them e. g. the outer one as shown in Fig. 10, a different yoke is necessary. With reference now to Figs. 10-16, it will be seen that this yoke is comprised of a single plate 33 welded to an end face of a short section 34 of a channel beam, the plate extending at a right angle to the plane of the web portion 34a to form an L-shaped member. The web portion 34a is provided with spaced apertures 34b at the same distance apart as the apertures 27b in channel beam 27 so as to enable it to be secured to the frame member 15 by the same stud bolts 29 and nuts 30.

When secured in position plate 33 extends across the flange of the trunnion frame channel 15 and the outer free end portion is provided with a rectangularly configured recess 33a establishing a yoke which embraces the crank arm portion 20 of the axle. The width of the yoke, i. e. between leg portions 33b can be sized as illustrated to make a snug fit with the opposite faces of the crank arm portion 20 since with the axle in this position, the crank arm portion 20 of the axle extends vertically above the trunnion frame beam 15. In the structure shown in Figs. 2–9, locking screws 32 must be associated with the two plates 26 which form the locking yoke because the width of the crank arm portion 20 is less than the width of the beam 15. Screws 32 could therefore be dispensed with in a construction where the width of crank arm 20 was made equal to the width of the beam 15. Such screws are not needed for yoke 33 since the crank arm portion 20 extends beyond the plane of the flanges of channel beam 15.

In Figs. 10–12, the yoke is fastened to the beam 15 with plate 33 beneath the lower flange and embracing the crank arm 20 in a vertically downward position thus locking the axle 18 with the outer wheel down and the inner one up.

The yoke is reversible, as shown in Fig. 13, in which case the plate 33 is above the upper flange on beam 15 and embraces the crank arm portion 20 in a vertically upward position thus locking axle 18 with the outer wheel up and the inner wheel down.

In conclusion it will be understood that while the foregoing embodiment is to be preferred, various minor changes in the construction and arrangement of components may be made without departing from the spirit and scope of the invention as defined in the appended claims.

I claim:

1. The combination with a frame and a normally oscillatable axle assembly comprising a rigid axle having coaxial end trunnions each freely oscillatable in bearings provided in said frame, said axle including crank arm portions extending transversely of the axle axis adjacent said end trunnions and two wheel mounting portions disposed between and substantially equally and oppositely eccentrically disposed with respect to said coaxial end trunnions and a wheel journalled on each of said wheel mounting portions, of means for locking said axle against oscillation, said locking means comprising a locking yoke embracing one crank arm portion of said axle, and means attaching said yoke to said frame.

2. An axle locking device as defined in claim 1 wherein said crank arm portion embraced by said yoke occupies a vertical position and said wheel mounting portions occupy respectively their uppermost and lowermost positions.

3. An axle locking device as defined in claim 1 wherein said crank arm portion embraced by said yoke occupies a horizontal position and said wheel mounting portions occupy their intermediate positions at the same level.

4. In a roller compactor the combination comprising a frame, at least two pairs of axially aligned bearings mounted in said frame in horizontal alignment, a normally oscillatable axle assembly journalled in each of said pairs of bearings, each said axle assembly comprising a rigid axle having co-axial end trunnions each freely oscillatable in the respective bearings of each pair, crank arm portions extending transversely of the axle axis adjacent said end trunnions and two wheel mounting portions disposed between and substantially equally and oppositely eccentrically disposed with respect to said coaxial end trunnions and a pneumatically tired wheel journalled on each of said wheel mounting portions, means individual to each said axle assembly for locking the assembly against oscillation, each said locking means comprising a locking yoke embracing one crank arm portion of said axle and means attaching said yoke to said frame.

5. An axial locking device as defined in claim 4 wherein said crank arm portion embraced by said yoke occupies a vertical position and said wheel mounting portions occupy respectively their uppermost and lowermost positions.

6. An axial locking device as defined in claim 4 wherein said crank arm portion embraced by said yoke occupies a horizontal position and said wheel mounting portions occupy their intermediate positions at the same level.

References Cited in the file of this patent

UNITED STATES PATENTS

| Number | Name | Date |
|--------|------|------|
| 2,239,849 | Judd | Apr. 29, 1941 |
| 2,286,576 | Ronning | June 16, 1942 |
| 2,391,948 | Couse | Jan. 1, 1946 |
| 2,612,387 | Ronning | Sept. 30, 1952 |